(12) United States Patent
Hagit et al.

(10) Patent No.: US 8,857,340 B2
(45) Date of Patent: Oct. 14, 2014

(54) SIMULANT MATERIAL FOR PRIMARY EXPLOSIVES

(75) Inventors: Shulman Hagit, Misgav (IL); Yael Cohen-Arazi, Kfar Vradim (IL); Edith Sokol, Zichron Yaakov (IL); Moshit Yaskin-Harush, Mitzpe Aviv (IL)

(73) Assignee: Rafael, Advanced Defense Systems Ltd., Haifa (IL)

( * ) Notice: Subject to any disclaimer, the term of this patent is extended or adjusted under 35 U.S.C. 154(b) by 83 days.

(21) Appl. No.: 13/227,642

(22) Filed: Sep. 8, 2011

(65) Prior Publication Data

US 2011/0315283 A1     Dec. 29, 2011

Related U.S. Application Data

(62) Division of application No. 12/318,820, filed on Jan. 8, 2009, now Pat. No. 8,641,843.

(30) Foreign Application Priority Data

Jan. 10, 2008 (IL) .......................................... 188714

(51) Int. Cl.
*F42B 4/18* (2006.01)

(52) U.S. Cl.
USPC ........................................................ 102/355

(58) Field of Classification Search
CPC ........................................................ F42B 4/18
See application file for complete search history.

(56) References Cited

U.S. PATENT DOCUMENTS

| 78,317 A | 5/1868 | Nobel |
| 4,005,657 A | 2/1977 | Rothman |
| 5,648,636 A * | 7/1997 | Simpson et al. ............... 102/355 |
| 5,958,299 A | 9/1999 | Kury et al. |
| 6,027,344 A | 2/2000 | Johanns et al. |
| 2007/0137500 A1 | 6/2007 | Ok et al. |
| 2009/0194744 A1 | 8/2009 | Adebimpe |

FOREIGN PATENT DOCUMENTS

| JP | 8-143070 A | 6/1996 |
| KR | 10-2012-0111705 A | 10/2012 |
| WO | 2004/063128 A1 | 7/2004 |
| WO | 2006/021949 A2 | 3/2006 |

OTHER PUBLICATIONS

The European Search Report for EP Application No. 12 16 3137; two pages; completed Apr. 18, 2013.
The International Search Report for PCT/IL2009/000034, mailed on Jun. 23, 2009, 3 pages.
U.S. Appl. No. 12/318,820.

* cited by examiner

*Primary Examiner* — Aileen B Felton
(74) *Attorney, Agent, or Firm* — Vorys, Sater, Seymour and Pease LLP; Susanne M. Hopkins

(57) ABSTRACT

Provided is a simulant material including a primary explosive and a carrier.

11 Claims, No Drawings

SIMULANT MATERIAL FOR PRIMARY EXPLOSIVES

This is a Divisional Application filed under 35 U.S.C. §120 as a division of Ser. No. 12/318,820, filed on Jan. 8, 2009, an application claiming the benefit under 35 U.S.C. §119 of Israeli Application No. 188714, filed on Jan. 10, 2008, the content of each of which is hereby incorporated by reference in its entirety.

FIELD OF THE INVENTION

The present invention generally relates to a simulant material for primary explosives.

BACKGROUND OF THE INVENTION

Explosive detection is an important component of the modern war against terrorism. Explosives may be categorized based on their chemical structure, their sensitivity in certain environments, their decomposition pathway or their general sensitivity to a variety of stimuli.

The UN hazard classification system for classifying explosive materials and explosive components is recognized and used internationally. The UN system consists of nine classes of dangerous materials, with explosives designated as Class 1. The explosives hazard class is further subdivided into six sub-divisions, which are used for segregating munitions and explosives on the basis of similarity of characteristics, properties, and accident effects potential. The six divisions are:

Division 1.1—Substances and articles that have a mass explosion hazard;

Division 1.2—Substances and articles that have a projection hazard but not a mass explosion hazard;

Division 1.3—Substances and articles that have a fire hazard and either a minor blast hazard or a minor projection hazard or both but not a mass explosion hazard;

Division 1.4—Substances and articles which present no significant hazard;

Division 1.5—Very insensitive substances which have a mass explosion hazard;

Division 1.6—Extremely insensitive articles which do not have a mass explosion hazard.

The above classification is further separated into compatibility groups A, B, C, D, E, F, G, H, J, K, L, N and S. For example, group A includes primary explosives and group D includes secondary explosives.

A primary explosive is defined as an explosive that is extremely sensitive to stimuli such as impact, friction, thermal, or electrostatic sources. Primary explosives are sufficiently sensitive that they can spontaneously initiate during "normal" operational activities. As a very general rule, primary explosives are considered to be those compounds that are more sensitive than Pentaerythritol Tetranitrate (PETN), which is considered as a primary explosive in Class 1.1A when it is in dry form, and a secondary explosive in Class 1.1D when it is wetted by at least 15% wt water.

A secondary explosive is less sensitive in comparison to primary explosives and is relatively insensitive to shock, friction, and heat. It may burn when exposed to heat or flame in small, unconfined quantities, and detonation is likely to occur with relatively sensitive secondary explosives. RDX and TNT are two such secondary explosives, so as wetted PETN.

At present, sniffer dogs are considered the most successful, sensitive and widespread tool for explosive detection at airports and in public areas. Detection of explosives by sniffer dogs (or by trained individuals as disclosed in U.S. Pat. No. 6,027,344) has been generally successful where the dog was able to recognize the distinct odor of the specific explosive material. In order for the dog to learn to selectively discriminate the odor of the explosive component from other components, the dog must be brought into intimate contact with the explosive, on numerous prior occasions, and preferably on-site, namley in the perimeter where the dog is assigned to. Under normal conditions, on-site training of sniffer dogs with live explosives is both highly dengerous and typically prohibited.

For primary explosives, training of sniffer dogs utilizing large amount of the explosive, as required by correct training procedures employed in traditional explosives training, is not feasible due to the danger associated with the handling of large quantities of the highly sensitive explosive. Thus, existing training aids for primary explosives are either unavailable in light of the great sensitivity of the primary exposlives or limited to employing only minute quantities of the explsoive (as low as a few micrograms, which would generally make them of limited reliability).

The detection of a primary explosive, such as TATP, by sniffer dogs has proven particularly problematic for numerous reasons, one of which being the danger the explosive imposes on both the dog and its human trainer and the lack of an appropriate stable simulant material as a training aid, which would have the explosive's distinct odor without the accompanied intrinsic instability.

Apart from the danger in handling large quantities of TATP, the use of powder expolsives renders the exposure of the sniffing dog during training to a health problem associated with the entry of powder particulates into its respiratory system, damaging the olfactory cells.

International Patent Application No. PCT/IL2005/000853 (published as WO 2006/021949) discloses a method for the preparation of a non-explosive, homogenous simulant material for simulating hazardous materials. According to the claimed method, the simulant is prepared by obtaining a mixture of at least one explosive material with at least one inert material and mixing said mixture until a homogenous, flexible and non-particulate, paste-like material is obtained.

While the method disclosed in WO 2006/021949 was found effective for the preparation of a vast number of simulants for sensitive explosives, due to the high sensitivity of primary explosives such as TATP the preparation of a suitable simulant material required a different approach.

U.S. Pat. No. 5,648,636 discloses a non-explosive simulant material comprising an explosive and an inert material. While the inventors explicitly list a great number of explosives which may be used, only the more stable explosives have been exemplified, none of which being a primary explosive in general or TATP in particular.

SUMMARY OF THE INVENTION

Thus, with the continued increase in the number of terrorist incidents in which TATP was involved and the urgent security need for a reliable detection method for primary explosives, such as peroxide-based explosives, and for supporting various counter-terrorism surveillance activities, the inventors of the present application embarked on the development of a material that would be suitable for use in the training of sniffer dogs and also in the better calibration of analytical equipment and sensors.

The inventors of the present application have developed a unique and stable material particularly for use as a simulant for primary explosives, such as hexamethylene triperoxide diamine, lead azide, lead styphnate, mercury fulminate, nitrogen trichloride, nitrogen triiodide, silver azide, silver fulminate, sodium azide, and triacetone triperoxide (TATP). The material retains key characteristic properties of the primary explosive, mainly the odor print of the explosive, while being substantially safer to the sniffer dog and its human trainer, and thus may be used for on-site training. As the material of the invention may be made into a great variety of forms, such as flexible rubber-like sheets, its use may be not only convenient vis-à-vis its safe handling, but also with respect to the health risk to the dog (by using powders) or the danger to the environment during its transport to/from the site of training.

In one aspect of the present invention, there is provided a secondary explosive material, for use as a simulant, comprising an amount of at least one primary explosive material and at least one solid inert carrier.

The secondary explosive material which results from the combination of an amount of at least one primary explosive material and at least one solid inert carrier may be used as a material having reduced sensitivity, while maintaining the key characteristic properties of the primary explosive and its odor print, as disclosed above. It should, thus, be clearly understood, that within the scope of the invention and unless otherwise indicated herein, the secondary explosive material is not a secondary explosive as defined in the art, but rather a material containing a primary explosive having a reduced sensitivity similar to that of a secondary explosive.

The primary-explosive-based secondary explosive material typically contains a concentration of a primary explosive of between about 5 to 20% (w/w). In some embodiments, the concentration is between 5 and 10% and in certain other embodiments the concentration is 5-7%. The primary explosive material is selected from hexamethylene triperoxide diamine, lead azide, lead styphnate, mercury fulminate, nitrogen trichloride, nitrogen triiodide, silver azide, silver fulminate, sodium azide, and triacetone triperoxide (TATP).

In some embodiments, said primary explosive is TATP. In some other embodiments, the TATP-based secondary explosive material is substantially free of DADP.

The primary-explosive-based secondary explosive material may be in the form of slurry, namely "wet" by at least one organic solvent, a paste-like material or dry, namely substantially free of volatile organic solvents or in any other form.

The solid inert carrier may be a dry powder material, selected from concrete, cement, pozzolana, $CaCO_3$, $SiO_2$, $Ca(SO_4)_2$ and others. In some other embodiments, said solid inert carrier is $CaCO_3$ or $Ca(SO_4)_2$.

In further embodiments, the primary-explosive-based secondary explosive material, comprising at least one primary explosive and a solid inert carrier, is a Class 1.1D explosive (according to the UN regulations).

The primary-explosive-based secondary explosive is a solid material, being substantially free of volatile organic solvents. In some embodiments, said primary explosive is TATP and said solid inert carrier is $CaCO_3$.

In some embodiments, the primary-explosive-based secondary explosive is further mixed with at least one other inert material, e.g., an inert polymer, namely a material which is different from said at least one solid inert carrier. In such embodiments, the resulting solid material, i.e., the simulant is thus in the form of, e.g., a flexible rubber-like sheet which comprises the primary-explosive-based secondary explosive and exhibits a reduced sensitivity of a non-explosive material (a non-Class 1 material according to UN regulations).

The inert material (e.g., polymer), which is different from the solid inert carrier, is selected from HTPB (hydroxy terminated polybutadiene), a polyurethane rubber, a dimethylsiloxane and other inert materials. The inert material, in which the primary-explosive-based secondary explosive is embedded, is used to impart the secondary simulant with handling properties, i.e., turning it into solid blocks, flexible sheets, paste, etc, and is used to reduce its sensitivity to provide a non-explosive simulant.

The invention further provides a material for use as a simulant of TATP, said simulant material comprising TATP and at least one solid inert carrier, optionally embedded, combined or in a mixture with at least one inert material, as herein disclosed.

The material of the invention, such as that particularly suitable as a stimulant of TATP, may be characterized as follows:

1. it has an odor profile (or print) which is identical to that of the primary explosive;
2. it is substantially homogenous;
3. it may be used as a dry solid, substantially free of any volatile organic solvent or as a moldable paste which may be molded and shaped taking on any form or size when dried;
4. it is highly stable, mechanically and chemically, making it safe for shipment and application;
5. it may comprise one or more other agents such as coloring agents, e.g. to label simulants of different concentrations; odor masking agents, e.g. to completely or substantially reduce the odor of the primary explosive; fire retarding agents; metallic agents and/or magnetic agents, e.g. to impart to the simulant magnetic properties; other explosives, e.g. to afford a simulant for more than one explosive; drugs; etc; and
6. it is suitable for training of sniffing animals and for calibrating analytical equipments and sensors.

As a person skilled in the art would appreciate, the material of the invention comprising at least one primary explosive and at least one solid inert carrier, and optionally at least one inert material (being different from the inert carrier) is quite different from the simulant materials of the art, particularly those of WO 2006/021949 and U.S. Pat. No. 5,648,636. Primarily, the difference lies in the inability to prepare a stable non-explosive and efficient simulant for a primary explosive, such as TATP, following a process as that disclosed in either publication, particularly in a form such as a flexible rubber-like sheet. Primary explosives do not permit a great deal of process manipulation and handling, as required by the processes of the art. The inability to prepare simulants of primary explosives, such as TATP, is not only evident from the lack of proper experimental support and working examples but also in the actual lack of commercial kits for such purposes based on the art.

In another aspect of the invention there is provided a process for the preparation of a material for use as a simulant of a primary explosive, said process comprising:

(1) providing a solution of a primary explosive in an organic solvent, (2) mixing the solution of said primary explosive with a solid inert carrier and evaporating the solvent to provide the primary-explosive-based secondary explosive simulant; and (3) optionally, mixing said primary-explosive-based secondary explosive into an inert material and optionally curing the mixture, to thereby afford a non-explosive simulant.

The solution of the primary explosive may be obtained by directly synthesizing the primary explosive in the solvent or by dissolving the pre-made explosive in an appropriate volume of the organic solvent. In some embodiments, the organic solvent is a single solvent or a mixture of two or more solvents. In some further embodiments, the organic solvent is selected from acetone, dichloromethane, chloroform and other organic solvents known in the art.

Once prepared, the solution of the explosive material is carefully mixed, i.e., by, e.g., mechanically stirring or mixing an inert carrier into the solution. Upon completion, the solvent is evaporated to provide a material of reduced sensitivity. This material may be used as a simulant material of a reduced sensitivity or further mixed with an inert material such as an inert polymer and optionally cured to afford a non-explosive simulant material.

In some embodiments, the non-explosive simulant may be formed into any desired form by molding the resulting material into various shapes in various sizes. In some embodiments, the non-explosive simulant material is in the form of a flexible rubber-like sheet.

The simulant material may further comprise at least one additive which may be added in any of the process stages or may be inherent to the simulant manufacture process, e.g., a contaminant. The at least one additive may be selected from a coloring agent, an odor agent, an odor masking agent, a fire retarding agent, a metallic agent, and a magnetic agent.

DETAILED DESCRIPTION OF THE INVENTION

The present invention provides a material for use as a simulant for primary explosives, which use and application has thus far been avoided in the training of humans and sniffing animals. As will be demonstrated herein with respect to TATP, such a reduction in the sensitivity of primary explosives now allows their use in the field as well as on-site where the sniffing animal is to be assigned to.

Acetone peroxide, also known as triacetone triperoxide and TATP, is a white crystalline organic trimer-peroxide of acetone that is highly unstable and, as a result, has been categorized as a primary explosive.

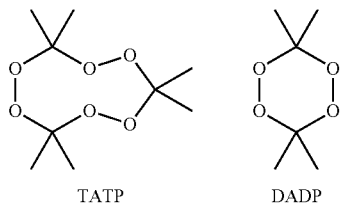

TATP          DADP

TATP is one of the most sensitive solid explosives known, being extremely sensitive to impact, temperature change and friction. Despite its known use by suicide bombers, it has sprung into notoriety only recently due to its alleged use in detonators by the 2001 thwarted "shoe bomber" Richard Reid. It has additionally been used as the primary explosive in the July 2005 London bombings and has also been reported as the explosive favored by suspects arrested on August 2006 who allegedly intended to destroy airplanes flying from the United Kingdom to the United States.

Many people have been killed or permanently injured by accidents with TATP. It is widely used by people who make it their objective to manufacture homemade explosives because of its low cost and ease of manufacture. TATP can be easily prepared using commercially available acetone, hydrogen peroxide and acid which are available raw materials obtained from hardware stores, pharmacies, and stores selling cosmetics.

TATP is regarded transparent to most explosive-detection devices and methodologies, as it lacks a nitro group, it does not fluoresce, it exhibits minimal UV absorption and has relatively low density. While TATP can be measured using expensive instruments such as chemical-ionization mass spectrometry (CI-MS) or IR spectroscopy, these bulky instruments are not suitable for field screening scenarios or trace analysis of peroxide-based explosives.

It should be understood that the TATP simulant is provided as a single non-limiting example of a simulant material for primary explosives. The sensitivity of the TATP in the material of the invention was reduced greatly from that of a primary explosive to that of a secondary explosive and further to a non-explosive material.

The TATP simulant as other simulants for primary explosives, as described in the present invention, may have predetermined varying physical properties as may be required. For example, the different TATP simulants may have different TATP concentrations, the simulant may be of different viscosity, color, consistency, homogeneity, may contain other explosives or other agents, etc. The non-explosive TATP simulant end product may be obtained in a form of a solid block, a flexible sheet or plastic, a powder, a moldable plastic, an emulsion and a gel. Additionally, the simulant material may be processed immediately after manufacture or may be fabricated at a later stage.

Typically, the simulant material according to the present invention comprises between about 5 to 20% (w/w) of the primary explosive. The primary explosive was in one example, in an amount ranging between 5 and 20%, in another example in an amount between about 5-10% and in other examples in an amount of about 5-7% of the total weight of the simulant material.

The invention claimed is:

1. A simulant material for simulating a primary explosive material, comprising triacetone triperoxide (TATP) primary explosive material, calcium carbonate ($CaCo_3$) solid inert carrier, and at least one inert material.

2. The simulant material according to claim 1 being substantially non-explosive (Non-Class 1 material).

3. The simulant material according to claim 1, wherein an odor-print of the simulant material is identical to that of the primary explosive material.

4. The simulant material according to claim 1 being substantially free of volatile solvents.

5. The simulant material according to claim 1 being suitable for detection by sniffing animals.

6. The simulant material according to claim 1, further comprising at least one additive selected from the group consisting of a coloring agent, an odor agent, an odor masking agent, a fire retarding agent, a metallic agent, a magnetic agent, and a contaminant.

7. The simulant material according to claim 1 being in a solid form.

8. A simulant for an explosive material, comprising triacetone triperoxide (TATP) explosive material and calcium carbonate ($CaCO_3$) solid carrier, wherein the simulant material has a reduced sensitivity in comparison with the triacetone triperoxide (TATP) explosive material and has an odor profile identical to that of the triacetone triperoxide (TATP) explosive material.

9. The simulant material according to claim 8, wherein the reduced sensitivity is characterized with reference to sensitivity/insensitivity to at least one of shock, friction, and heat.

10. A simulant material for detection by a sniffer dog, the simulant material being that of claim 1.

11. The simulant material according to claim 1 being in the form of a flexible rubber-like sheet.

* * * * *